Oct. 22, 1957     G. ROMI     2,810,306
INDEXABLE MULTIPLE TOOL TURRET
Filed Jan. 18, 1954     2 Sheets-Sheet 1
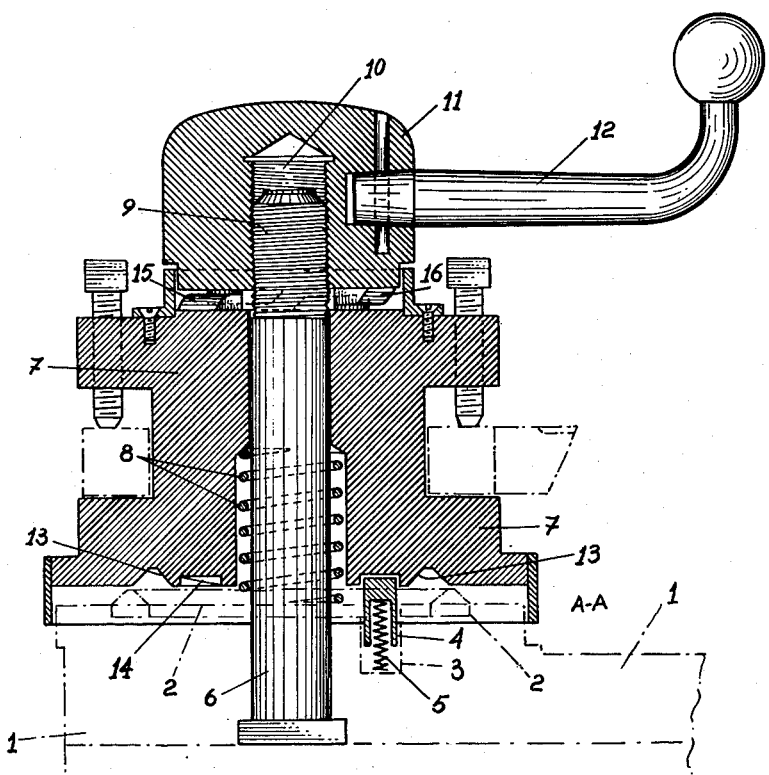
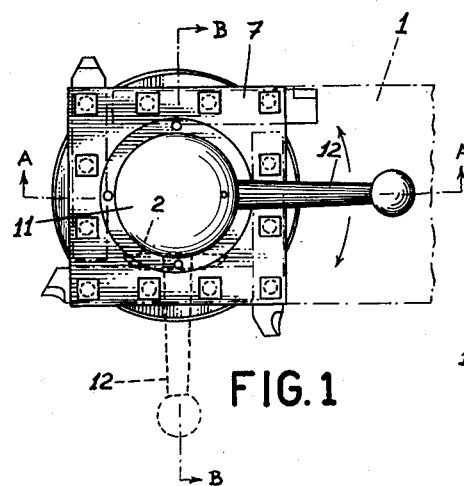
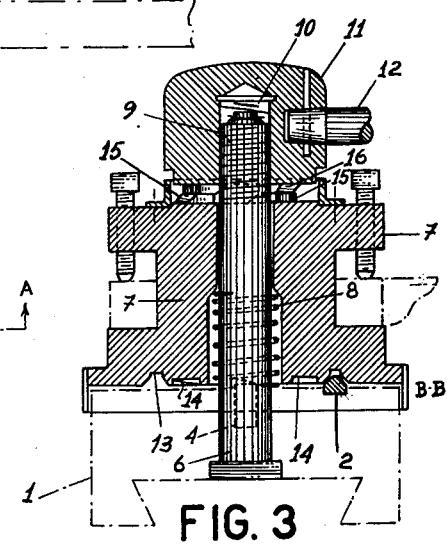
INVENTOR.
GIORDANO ROMI
BY Oct. 22, 1957 G. ROMI 2,810,306
INDEXABLE MULTIPLE TOOL TURRET
Filed Jan. 18, 1954 2 Sheets-Sheet 2
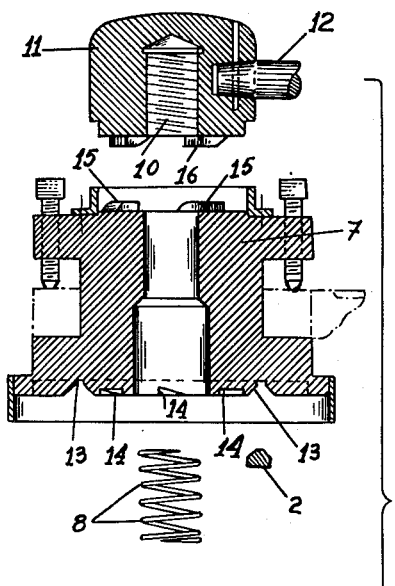
FIG. 4
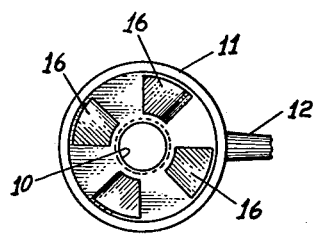
FIG. 6
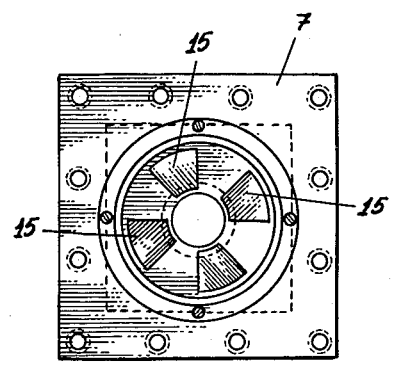
FIG. 7
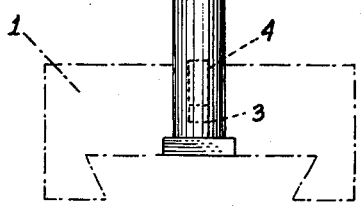
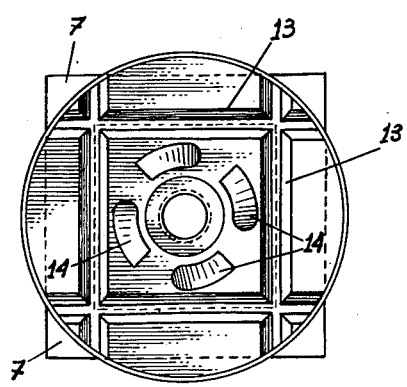
FIG. 8
FIG. 5
INVENTOR.
GIORDANO Romi
BY

2,810,306

INDEXABLE MULTIPLE TOOL TURRET

Giordano Romi, Santa Barbara D'Oeste, Brazil, assignor to Maquinas Agricolas "Romi" Limitada, Santa Barbara D'Oeste, Brazil, a Brazilian firm Application January 18, 1954, Serial No. 404,471

Claims priority, application Brazil March 17, 1953

5 Claims. (Cl. 74—826)

The object of the present invention is an automatic tool-head suitable for machine tools in general, of perfect performance, easy operation and modern construction, permitting the quick realization of the desired actions.

The automatic head in question, preferably for four tools, may be adapted to lathes or any machine tool, and presents the following advantages: (a) smaller angular movement exerted by the control handle when passing from one position to the other, because under normal conditions a displacement of 115° is sufficient to automatically change the position of the tool; (b) positive location of the tool by engagement of prismatic surfaces, thus eliminating the antiquated taper pins which soon lose their precision; (c) simplicity of tool-head construction, permitting its manufacture at a much more economical cost than the presently used types; (d) high precision on repeating the tool positions and absolute guarantee of this precision for indefinite time, because same is based upon a principle which does not effect the positioning by means of friction between taper pins and their respective seats, but by engagement of prismatic surfaces; (e) impossibility of the tool-holder to be displaced during operation, even when executing very heavy and deep cuts, in any rotational direction of the work-piece or of the feed of the slide-rest; (f) fixation of the tool-head with small effort of the operator.

The invention will be better understood from the attached drawings, which represent a non-restrictive example, and in which:

Fig. 1 is a top view of the tool-head,

Fig. 2 is section A—A,

Fig. 3 is section B—B,

Fig. 4 is a vertical section through the members constituting the unit,

Fig. 5 is a side view of the prismatic member of the unit,

Fig. 6 is a view from below of the tool-head,

Fig. 7 is a top view of the tool-holder block,

Fig. 8 is a view from below of the same block.

The automatic tool-head in question presents an elongated prismatic member 2 suitably fixed to the usual slide-rest 1 of a lathe; said slide-rest is provided with an opening 3, into which fits a pin 4 maintained in elevated position by means of spring 5. Said slide-rest sustains further a vertical shaft 6 passing through the tool block 7, provided in its interior with a spring 8, said shaft being threaded at its upper end 9, with which it is screwed in the lower central opening 10 of a head-piece 11, provided with control handle 12.

The lower face of tool block 7 presents four prismatic grooves 13, crossing in right angles, in correspondence to the prismatic member 2; said face is further provided with seats in form of annulus sectors 14, tapered in the same direction, into which seats pin 4 may be fitted at any given moment.

This tapered annulus sector 14, and the pin 4, are provided to enable the pre-location of the tool block 7, in such a way that allows one of the prismatic grooves 13, to assume a correct position in relationship to the prismatic member 2, thus permitting, with a further movement of control handle 12 that the prismatic groove 13 will engage on prismatic member 2, when the control handle 12 is rotated towards fixing block 7, as will be explained later.

At its upper face, block 7 presents cams 15 in correspondence to similar cams 16 located at the base of head-piece 11.

The operation of the unit is the following: the block receives the suitably fixed tools, as indicated in the figures; let us imagine one tool operating: head-piece 11 is tightened in a certain direction, compressing by means of its cams 16 the cams 15 of block 7. Said block is engaged with one of its prismatic grooves on prism 2.

In order to change a tool, i. e., to displace the used one and to place a new one in operating position, it is sufficient to turn head-piece 11 in a certain sense by means of its handle 12; cams 16 will be displaced and located between cams 15, due to the fact that spring 8 forces block 7 upwards, whereby the vertical walls of cams 15 and 16 will come into contact, forming a clutch by means of which block 7 is rotated.

At the same time pin 4 leaves the annulus sector where it was fitted, sliding along its tapered surface and falling into the next sector, pre locating tool block 7. Thus, the tool will be located with absolute precision in its working position, where it is fixed by a movement in opposite direction of handle 12, whereby block 7 returns to its lower position, with juxtaposition of the horizontal faces of cams 15 and 16, and consequently engaging one of the prismatic grooves 13 of block 7 on prismatic member 2.

The changing of tools is therefore automatic, instantaneous and precise, which guarantees a higher working speed as well as a smaller effort from the operator, hence his output will be greater.

Having thus described the invention, what I claim is:

1. Index turret apparatus comprising, in combination, stationary supporting means including a base; an operating member turnably mounted on said supporting means spaced from said base; a tool block turnably mounted on said supporting means between said operating member and said base, said tool block being mounted on said supporting means for movement between a first position closer to said operating member and a second position closer to said base; means urging said tool block into said first position; two sets of cooperating index cam means secured, respectively, to said operating member and to said tool block, each index cam means having an inclined side face, a coupling side face, and a top face, said inclined side faces of said two sets of index cam means sliding on each other during relative turning between said operating member and said tool block in one direction whereby said tool block moves to said second position when said top faces of said sets of index cam means engage each other, said coupling side faces of said two sets of index cam means engaging each other in said first position of said tool block when said operating member is turned in a direction opposite to said one direction so that said tool block turns in said first position with said operating member in said opposite direction; means on said supporting means and said tool block and blocking relative rotation in said opposite direction between said tool block and said base; and locking means on said base and on said tool block for locking said tool block in said second position to said base in a plurality of angularly spaced positions, said locking means being inoperative when said tool block is in said first position thereof.

2. Index turret apparatus comprising, in combination, stationary supporting means including a spindle having a threaded end portion and a base; a threaded operating member turnably mounted on said threaded end portion of said spindle spaced from said base; a tool block turnably mounted on said spindle between said operating member and said base, said tool block being slidable on said spindle for movement between a first position closer to said operating member and a second position closer to said base; means urging said tool block into said first position; two sets of cooperating index cam means secured, respectively, to said operating member and to said tool block, each index cam means having an inclined side face, a coupling side face, and a top face, said inclined side faces of said two sets of index cam means sliding on each other during relative turning between said operating member and said tool block in one direction whereby said tool block moves to said second position when said top faces of said sets of index cam means engage each other, said threaded operating member being screwed on said threaded spindle portion toward said tool block during turning of said operating member in said one direction for clamping said tool block in said second position when said top faces engage each other, said coupling side faces of said two sets of index cam means engaging each other in said first position of said tool block when said operating member is turned in a direction opposite to said one direction so that said tool block turns in said first position with said operating member in said opposite direction; means on said base and said tool block and blocking relative rotation in said opposite direction between said tool block and said base; and locking means on said base and on said tool block for locking said tool block in said second position to said base in a plurality of angularly spaced positions, said locking means being inoperative when said tool block is in said first position thereof.

3. Index turret apparatus comprising, in combination, stationary supporting means including a spindle having a threaded end portion and a base; a threaded operating member turnably mounted on said threaded end portion of said spindle spaced from said base; a tool block turnably mounted on said spindle between said operating member and said base, said tool block being slidable on said spindle for movement between a first position closer to said operating member and a second position closer to said base; means urging said tool block into said first position; two sets of cooperating index cam means secured, respectively, to said operating member and to said tool block, each index cam means having an inclined side face, a coupling side face, and a top face, said inclined side faces of said two sets of index cam means sliding on each other during relative turning between said operating member and said tool block in one direction whereby said tool block moves to said second position when said top faces of said sets of index cam means engage each other, said threaded operating member being screwed on said threaded spindle portion toward said tool block during turning of said operating member in said one direction for clamping said tool block in said second position when said top faces engage each other, said coupling side faces of said two sets of index cam means engaging each other in said first position of said tool block when said operating member is turned in a direction opposite to said one direction so that said tool block turns in said first position with said operating member in said opposite direction; ratchet means on said base and said tool block and blocking relative rotation in said opposite direction between said tool block and said base; a plurality of elongated prismatic locking members fixed on said base projecting from the same; and a plurality of elongated recessed locking members on said tool block cooperating with said prismatic locking members for locking said tool block in said second position to said base in a plurality of angularly spaced positions, said prismatic locking members being spaced from said recessed locking members when said tool block is in said first position thereof.

4. Index turret apparatus comprising, in combination, stationary supporting means including a spindle and a base; an operating member turnably mounted on said spindle spaced from said base; a tool block turnably mounted on said spindle between said operating member and said base, said tool block being slidable on said spindle for movement between a first position closer to said operating member and a second position closer to said base, said tool block having an operating portion located opposite said base and being formed with a set of ratchet recesses; two sets of cooperating index cam means secured, respectively, to said operating member and to said tool block, each index cam means having an inclined side face, a coupling side face, and a top face, said inclined side faces of said two sets of index cam means sliding on each other during relative turning between said operating member and said tool block in one direction whereby said tool block moves to said second position when said top faces of said sets of index cam means engage each other, said coupling side faces of said two sets of index cam means engaging each other in said first position of said tool block when said operating member is turned in a direction opposite to said one direction so that said tool block turns in said first position with said operating member in said opposite direction; ratchet pin means mounted on said base cooperating with said ratchet recesses and blocking relative rotation in said opposite direction between said tool block and said base; spring means urging said ratchet pin means into engagement with said tool block and urging said tool block into said first position; and locking means on said base and on said tool block for locking said tool block in said second position to said base in a plurality of angularly spaced positions, said locking means being inoperative when said tool block is in said first position thereof.

5. Index turret apparatus comprising, in combination, stationary supporting means including a spindle having a threaded end portion and a base; a threaded operating member including a handle and being turnably mounted on said threaded end portion of said spindle spaced from said base; a tool block turnably mounted on said spindle between said operating member and said base, said tool block being slidable on said spindle for movement between a first position closer to said operating member and a second position closer to said base, said tool block having an operating portion located opposite said base and being formed with a set of ratchet recesses; coil spring means located around said spindle and having one end engaging said tool block and another end abutting against said base for urging said tool block into said first position; two sets of cooperating index cam means secured, respectively, to said operating member and to said tool block, each index cam means having an inclined side face, a coupling side face, and a top face, said inclined side faces of said two sets of index cam means sliding on each other during relative turning between said operating member and said tool block in one direction whereby said tool block moves to said second position when said top faces of said sets of index cam means engage each other, said threaded operating member being screwed on said threaded spindle portion toward said tool block during turning of said operating member in said one direction for clamping said tool block in said second position when said top faces engage each other, said coupling side faces of said two sets of index cam means engaging each other in said first position of said tool block when said operating member is turned in a direction opposite to said one direction so that said tool block turns in said first position with said operating member in said opposite direction; ratchet pin means mounted on said base cooperating with said ratchet recesses and blocking relative rotation in said opposite direction between said tool block and said base; spring means urging said ratchet pin means into engagement with said tool block and urging said tool block into said first position; and locking means on said base and on said tool block for locking said tool block in said second position to said base in a plurality of angularly spaced positions, said locking means being inoperative when said tool block is in said first position thereof.

References Cited in the file of this patent

UNITED STATES PATENTS

| | | |
|---|---|---|
| 462,160 | Pihl | Oct. 27, 1891 |
| 1,232,999 | Tolles | July 10, 1917 |
| 2,202,117 | Muller | May 28, 1940 |
| 2,305,728 | Millholland | Dec. 22, 1942 |
| 2,547,616 | Beekman | Apr. 3, 1951 |

FOREIGN PATENTS

| | | |
|---|---|---|
| 682,793 | Great Britain | Nov. 19, 1952 |